United States Patent Office 3,263,093
Patented July 26, 1966

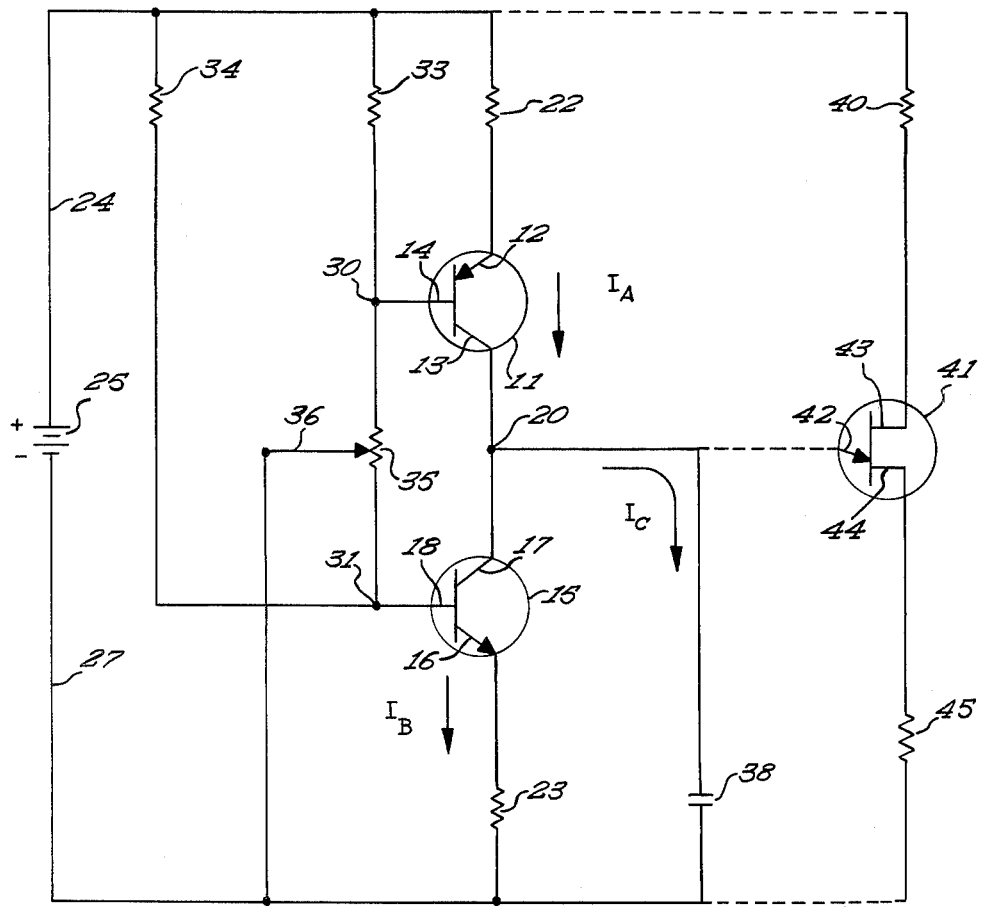

3,263,093
RAMP GENERATOR EMPLOYING CONSTANT
CURRENT SINK MEANS CONTROLLING
CAPACITOR CHARGING CURRENT FROM
CONSTANT CURRENT SOURCE
David P. Erdmann, St. Louis Park, Minn., assignor to Honeywell Inc., a corporation of Delaware
Filed Oct. 2, 1963, Ser. No. 313,239
5 Claims. (Cl. 307—88.5)

This invention is concerned with semiconductor control apparatus, and more particularly with improved linear voltage ramp generator apparatus, which includes transistor devices in an arrangement for the improvement of wave shape output under varying temperature conditions and voltage-current requirements.

Ramp generators are well known in the art. More particularly, voltage ramp generators utilizing a pair of transistors of the opposite conductivity type to charge and discharge a capacitor are well known in the art. These known ramp generators have two major problems. Firstly, since the capacitor charging current is regulated by a single transistor which is switched on and off, the current flow and thus the rate of charge of the capacitor is subject to non-linear changes due to temperature effects. Normal temperature compensating biasing for the transistor is often cumbersome and does not always achieve adequate compensation over a wide temperature range. Secondly, the charging time of these presently known ramp generators is limited by the physical size of the capacitor. Once having chosen a particular transistor and having temperature compensated it for a particular current range, in order to achieve a long time voltage ramp output, a large capacitor must be used to store the energy. In this modern era of space technology, physical size and weight are important factors in electronic systems.

It is therefore an object of this invention to provide a voltage ramp generator capable of putting out a linear wave form over a wide range of temperature conditions.

It is a further object of this invention to provide a compact, rugged, linear voltage ramp generator capable of putting out short or long time voltage ramp wave forms without the need for a large and thus unreliable energy storage means.

These and other objects of the invention will become apparent upon consideration of the accompanying claims, specification and drawing, of which:

The single figure is a schematic diagram of an embodiment of the invention for a ramp generator, including one example of many possible restart means for the ramp generator of the invention.

Referring now to the single figure there is disclosed a pair of semiconductor devices here shown as a PNP transistor 11 and an NPN transistor 15. Transistor 11 has an emitter 12, a collector 13 and a base 14. Transistor 15 has an emitter 16, a collector 17 and a base 18. Collector 13 is connected to collector 17 at junction 20. Emitter 12 is connected through a resistor 22 to a positive buss line 24 which is connected to the positive terminal of a source of energy here shown as battery 25. Emitter 16 is connected through a resistor 23 to a negative buss line 27 which is connected to the negative terminal of battery 25. Base 14 is connected to a junction 30. A resistor 33 is connected between junction 30 and positive buss line 24. Base 18 is connected to a junction 31. A resistor 34 is connected between junction 31 and positive buss line 24. A potentiometer 35 is connected between junctions 30 and 31. A wiper arm 36 of potentiometer 35 is connected to negative buss line 27. An energy storage means here shown as capacitor 38 is connected between junction 20 and negative buss line 27.

An example of one of many possible reset circuits is shown, made up of resistors 40 and 45, and a unijunction transistor 41 having a control electrode 42, a first output electrode 43, and a second output electrode 44. Resistor 40 has one end connected to the first output electrode 43. Resistor 45 has one end connected to the second output electrode 42. The dotted lines indicate possible connections of this reset circuit to the invention, thus indicating that the other end of resistor 45 may be connected to negative buss line 27, the control electrode 42 may be connected to junction 20, and the other end of resistor 40 may be connected to positive buss line 24.

In considering operation of the schematic of the drawing it will be helpful to first investigate the equation for charging the capacitor. The well known voltage-current relationship is:

$$Vc(t) = (I/C)t$$

It will be recognized that $Vc(t)$ is the voltage across the charging capacitor as a function of the time, $t$. To achieve linearity of the voltage function, the charging current, I, must remain constant, and the relative value of capacitance, C, must be reliably constant, over the entire charge time, $t$. In linear ramp generators problems of linearity arise when long time ramps are desired, and when the circuitry will be exposed to temperature changes. Note from the above equation that when the time, $t$, is increased and it is desired to keep the maximum value of voltage, Vc, at a particular level, that either the charging current, I, must decrease, or the capacitance, C, must increase. It is a well known practical fact that large capacitors tend to be unreliable. It is also well known that a single transistor, operating at low currents, tends to be subject to non-linearity due to temperature changes. It is among the objects of this invention to alleviate these problems.

Referring to the single figure of the drawing, biasing resistors 22 and 33 are chosen of a value such that transistor 11 will act as a constant current generator. Biasing resistors 23 and 34 are chosen of a value such that transistor 15 will act as a constant current sink. Potentiometer 35 is connected between the bases 14 and 18 of transistors 11 and 15, such that by varying the position of wiper arm 36, transistor 15 may be biased to accept all, none, or any part of the collector current flowing through transistor 11. Now, assume a constant collector current, Ia, is flowing through transistor 11. Also assume that the wiper arm 36 of potentiometer 35 is adjusted to allow a constant collector current flow, Ib, into transistor 15. If Ia is greater than Ib by an amount, Ic, this excess current, Ic, must flow into and charge the capacitor 38. If Ia and Ib are equal, since both collector currents must be constant, no charging current will flow into capacitor 38. Thus by a simple adjustment of wiper arm 36, the charging current can be varied from zero to a maximum value established by saturation of transistor 11, and since the charging current can be made extremely small, long time ramps can be achieved without a large and thus unreliable capacitor. Further, it is well known that a single transistor biased to operate at a small current, is more susceptible to variations in current due to temperature changes, than is the same transistor biased at an intermediate current output. This disadvantage is overcome by using the two transistors 11 and 15 biased at slightly different intermediate currents to achieve a small charging current.

Temperature compensation is achieved through the use of the current source-current sink combination, which is additive to the normal temperature biasing of the individual transistors. This may be seen in the following analysis of temperature effects on the charging current.

Let the current through transistor 11, transistor 15, and capacitor 38, at a first temperature be, respectively, $Ia_1$, $Ib_1$, and $Ic_1$. Then the equation for charging current will be:

$$Ic_1 = Ia_1 - Ib_1$$

Now assume an increase to a second temperature, which increase will cause an additional current flow through each of transistors 11 and 15, which may be designated $\Delta Ia_2$ and $\Delta Ib_2$. The equation for charging current now becomes:

$$Ic_2 = Ia_2 - Ib_2$$

but $$Ia_2 - Ib_2 = (Ia_1 + \Delta Ia_2) - (Ib_1 + \Delta Ib_2)$$

therefore $$Ic_2 = (Ia_1 - Ib_1) + (\Delta Ia_2 - \Delta Ib_2)$$

or, substituting $$Ic_2 = Ic_1 + (\Delta Ia_2 - \Delta Ib_2)$$

It is apparent from this last equation that the change in charging current due to a temperature change is the difference in the current changes in the individual transistors. This, by definition, must be less than the change occurring in a single transistor. Further, if the transistors 11 and 15 are selected of a like material and similar construction, they will tend to vary the same amount with temperature changes, and the difference between their individual temperature changes will approach zero.

It will be obvious that the general principles herein disclosed may be embodied in many other embodiments widely different from those illustrated, without departing from the spirit of the invention as defined in the following claims.

I claim as my invention:

1. A linear ramp generator comprising: a source of energy; constant current source means including a first semiconductor current amplifying device having first and second current carrying electrodes and a control electrode; constant current sink means including a second semiconductor current amplifying device having first and second current carrying electrodes and a control electrode; means connecting said first current carrying electrode of said first semiconductor device to said first current carrying electrode of said second semiconductor device; means connecting said second current carrying electrode of said first semiconductor device to a first polarity of said source of energy; means connecting said second current carrying electrode of said second semiconductor device to a second polarity of said source of energy; adjustable means connected intermediate said control electrodes of said first and second semiconductor devices, for regulating the amount of current allowed to flow into said constant current sink means; a capacitor; and means connecting said capacitor across said constant current sink means, such that when the current from said constant current source means is not equal to the current allowed to flow into said constant current sink means, the constant difference between said currents will linearly charge said capacitor.

2. A linear ramp generator comprising: a source of unidirectional potential; a first transistor having emitter, collector and base electrodes; a second transistor having emitter, collector and base electrodes; connecting means connecting said collector electrode of said first transistor to said collector electrode of said second transistor; first impedance means connecting said emitter electrode of said first transistor to a first polarity of said source of unidirectional potential; second impedance means connecting said emitter electrode of said second transistor to a second polarity on said source of unidirectional potential; third impedance means connecting said base electrode of said first transistor to said first polarity of said source of unidirectional potential; fourth impedance means connecting said base electrode of said second transistor to said first polarity of said source of unidirectional potential; adjustable impedance means having first and second terminals and an adjustable wiper arm, said first terminal connected to said base of said first transistor, said second terminal connected to said base of said second transistor, said adjustable wiper arm connected to said second polarity of said source of unidirectional potential; and a capacitor connected across said second transistor, such that when the current flowing through said first transistor is not equal to the current flowing through said second transistor, the difference between said currents will charge said capacitor.

3. A linear ramp generator comprising: a source of energy; first and second transistors of opposite conductivity types, each having emitter, collector and base electrodes; means connecting the emitter electrode of said first transistor to a first polarity of said source of energy; means connecting the emitter electrode of said second transistor to a second polarity of said source of energy; means connecting the collector electrodes of said first and second transistors to each other; first biasing means connected intermediate the base electrode of said second transistor and said first polarity of said source of energy; second biasing means connected intermediate the base electrode of said first transistor and said first polarity of said source of energy; third biasing means connected intermediate the base electrodes of said first and second transistors, for adjusting the current allowed to flow through said second transistor; and a capacitor connected intermediate the collector electrode of said second transistor and said second polarity of said source of potential, such that when the current through said first transistor is not equal to the current allowed to flow through said second transistor, the difference between said currents will charge said capacitor.

4. A linear ramp generator according to claim 1 wherein said first and second semiconductor current amplifying devices are first and second transistors each having emitter and collector current carrying electrodes and a base control electrode.

5. A linear ramp generator according to claim 3, wherein said first transistor is of the PNP conductivity type, and said second transistor is of the NPN conductivity type.

References Cited by the Examiner

UNITED STATES PATENTS

| | | | |
|---|---|---|---|
| 2,413,063 | 12/1946 | Miller | 328—183 X |
| 2,965,770 | 12/1960 | Lewinter | 307—88.5 |
| 3,011,068 | 11/1961 | McVey | 307—88.5 |
| 3,125,694 | 3/1964 | Palthe | 307—88.5 |

ARTHUR GAUSS, *Primary Examiner.*

J. HEYMAN, J. ZAZWORSKY, *Assistant Examiners.*